US012619762B1

(12) United States Patent
Agarwal et al.

(10) Patent No.: US 12,619,762 B1
(45) Date of Patent: May 5, 2026

(54) GROUP-BASED AFFINITY SCORING FOR AFFILIATE WEBSITES

(71) Applicant: Shape Security, Inc., Santa Clara, CA (US)

(72) Inventors: Sumit Agarwal, Pal Alto, CA (US); Yao Zhao, Fremont, CA (US)

(73) Assignee: SHAPE SECURITY, INC., Seattle, WA (US)

( * ) Notice: Subject to any disclaimer, the term of this patent is extended or adjusted under 35 U.S.C. 154(b) by 0 days.

(21) Appl. No.: 16/898,077

(22) Filed: Jun. 10, 2020

Related U.S. Application Data

(60) Provisional application No. 62/859,332, filed on Jun. 10, 2019.

(51) Int. Cl.
| | |
|---|---|
| *G06F 21/62* | (2013.01) |
| *G06F 16/958* | (2019.01) |
| *G06Q 30/0241* | (2023.01) |
| *G06Q 30/0251* | (2023.01) |
| *G06Q 50/26* | (2024.01) |

(52) U.S. Cl.
CPC ........ *G06F 21/6245* (2013.01); *G06F 16/958* (2019.01); *G06Q 30/0255* (2013.01); *G06Q 30/0263* (2013.01); *G06Q 30/0277* (2013.01); *G06Q 50/265* (2013.01)

(58) Field of Classification Search
CPC .............. G06F 21/6245; G06F 16/958; G06Q 30/0277; G06Q 30/0255; G06Q 30/0263; G06Q 50/265
See application file for complete search history.

(56) References Cited

U.S. PATENT DOCUMENTS

| | | | | |
|---|---|---|---|---|
| 6,529,952 B1* | 3/2003 | Blumenau | .............. | G06Q 30/02 707/E17.116 |
| 8,396,742 B1* | 3/2013 | Blume | ............... | G06Q 30/0246 705/14.1 |
| 2004/0122730 A1* | 6/2004 | Tucciarone | ......... | H04L 12/1859 705/14.66 |
| 2006/0173743 A1* | 8/2006 | Bollay | .................. | G06Q 30/02 705/14.66 |
| 2008/0140525 A1* | 6/2008 | Lamsfuss | ........... | G06Q 30/0277 705/14.54 |

(Continued)

OTHER PUBLICATIONS

Panagiotis Papadopoulos; Cookie Synchronization: Everything You Always Wanted to Know But Were Afraid to Ask; May 26, 2018; Proceedings of the 2018 World Wide Web Conference.*

*Primary Examiner* — Arthur Duran
(74) *Attorney, Agent, or Firm* — Troutman Pepper Locke LLP

(57) ABSTRACT

A method, non-transitory computer readable medium, device and system that maintains aggregate visit data comprising group visit data for a plurality of groups and a plurality of affiliate websites based on processed request data for a plurality of requests. First request data corresponding to a first request from a client to a web server system is received. At least a first group from the plurality of groups is determined based on the first request data. First group visit data for the first group is obtained from the aggregate visit data. Affinity data comprising affinity scores for the affiliate websites is generated based on the first group visit data and is used to determine affiliate content served in association with web content served by the web server system.

20 Claims, 8 Drawing Sheets

(56)             References Cited

U.S. PATENT DOCUMENTS

| 2012/0023547 A1* | 1/2012 | Maxson | ............. H04L 63/0407 |
| | | | 726/1 |
| 2012/0084151 A1* | 4/2012 | Kozak | ................... G06Q 30/02 |
| | | | 705/14.58 |
| 2012/0290399 A1* | 11/2012 | England | ................ G06Q 50/01 |
| | | | 705/14.66 |
| 2015/0348109 A1* | 12/2015 | Hasson | ............. G06Q 30/0256 |
| | | | 705/14.54 |
| 2016/0140587 A1* | 5/2016 | Wilson | ............... G06F 16/2291 |
| | | | 705/7.33 |
| 2016/0260129 A1* | 9/2016 | Fadeev | ............. G06Q 30/0255 |
| 2017/0180497 A1* | 6/2017 | Comstock | .............. H04L 67/01 |
| 2019/0050874 A1* | 2/2019 | Matlick | ................ H04L 67/535 |

* cited by examiner

| X1: 850 332 |
| --- |
| X2: 482 334 |
| X3: 236 336 |
| AFFINITY DATA 302 |

| X1: 0.85 338 |
| --- |
| X2: 0.482 340 |
| X3: 0.236 342 |
| AFFINITY DATA 304 |

| X1 High 350 |
| --- |
| X2 Medium 352 |
| X3 Low 354 |
| AFFINITY DATA 308 |

| X1 High 344 |
| --- |
| X2 Medium 346 |
| AFFINITY DATA 306 |

| X1, X2, X3 356 |
| --- |
| AFFINITY DATA 310 |

| X1, X2 358 |
| --- |
| AFFINITY DATA 312 |

FIG. 3A

| Department Stores | Travel | Clothing Chain Stores |
| --- | --- | --- |
| A1: Medium 372 | B1: Low 378 | C1: Low 382 |
| A2: High 374 | B2: Medium 380 | C2: Very Low 384 |
| A3: Low 376 | | C3: Very Low 386 |
| | AFFINITY DATA 322 | |

| Department Stores | Travel |
| --- | --- |
| A2: High 388 | B2: Medium 392 |
| A1: Medium 390 | AFFINITY DATA 324 |

| A2, B2, A1 394 |
| --- |
| AFFINITY DATA 326 |

| A2, A1 396 | B2 398 |
| --- | --- |
| AFFINITY DATA 328 | |

FIG. 3B

Hello user, sign up for a program with one of our affiliates:

A2 CONTENT 316

B2 CONTENT 318

A1 CONTENT 320

AFFILIATE CONTENT 314

MAINTAIN AGGREGATE VISIT DATA 502

PROCESS REQUEST DATA TO UPDATE AGGREGATE VISIT DATA 504

RECEIVE FIRST REQUEST DATA 506

DETERMINE FIRST GROUP 508

OBTAIN FIRST GROUP VISIT DATA FOR FIRST GROUP 510

GENERATE AFFINITY DATA BASED ON FIRST GROUP VISIT DATA 512

RETURN 514

GROUP-BASED AFFINITY SCORING FOR AFFILIATE WEBSITES

This application claims the benefit of U.S. Provisional Patent Application Ser. No. 62/859,332 filed Jun. 10, 2019, which is hereby incorporated by reference in its entirety.

FIELD

This technology generally relates to security techniques applicable to client and server systems, and relates more specifically to group-based affinity scoring for affiliate websites.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Security has three pillars: confidentiality, integrity, and availability. Security solutions often focus on the first two pillars and accept any loss of availability. However, security needs availability to be useful.

Some companies attempt to provide availability by tracking users across domains or websites, which may require excessive user consent popups. Many users blindly accept these popups which incur a heavy cost with regard to their privacy.

Accordingly, a new privacy-preserving security system that focuses on availability is desired.

SUMMARY

A method implemented by a network traffic management system comprising one or more group affinity server systems, server devices, or client devices includes maintaining aggregate visit data comprising group visit data for a plurality of groups and a plurality of affiliate websites based on processed request data for a plurality of requests. First request data corresponding to a first request from a client to a web server system is received. At least a first group from the plurality of groups is determined based on the first request data. First group visit data for the first group is obtained from the aggregate visit data. Affinity data comprising affinity scores for the affiliate websites is generated based on the first group visit data and is used to determine affiliate content that is served in association with web content served by the web server system.

A non-transitory computer readable medium having stored thereon instructions for workload processing comprising executable code that, when executed by one or more processors, causes the one or more processors to maintain aggregate visit data comprising group visit data for a plurality of groups and a plurality of affiliate websites based on processed request data for a plurality of requests. First request data corresponding to a first request from a client to a web server system is received. At least a first group from the plurality of groups is determined based on the first request data. First group visit data for the first group is obtained from the aggregate visit data. Affinity data comprising affinity scores for the affiliate websites is generated based on the first group visit data and is used to determine affiliate content that is served in association with web content served by the web server system.

A group affinity server device, comprising memory comprising programmed instructions stored thereon and one or more processors configured to be capable of executing the stored programmed instructions to that maintains aggregate visit data comprising group visit data for a plurality of groups and a plurality of affiliate websites based on processed request data for a plurality of requests. First request data corresponding to a first request from a client to a web server system is received. At least a first group from the plurality of groups is determined based on the first request data. First group visit data for the first group is obtained from the aggregate visit data. Affinity data comprising affinity scores for the affiliate websites is generated based on the first group visit data and is used to determine affiliate content that is served in association with web content served by the web server system.

A network traffic management system, comprising one or more network security apparatuses, server devices, or client devices with memory comprising programmed instructions stored thereon and one or more processors configured to be capable of executing the stored programmed instructions to maintain aggregate visit data comprising group visit data for a plurality of groups and a plurality of affiliate websites based on processed request data for a plurality of requests. First request data corresponding to a first request from a client to a web server system is received. At least a first group from the plurality of groups is determined based on the first request data. First group visit data for the first group is obtained from the aggregate visit data. Affinity data comprising affinity scores for the affiliate websites is generated based on the first group visit data and is used to determine affiliate content that is served in association with web content served by the web server system.

Example of this technology provide a number of advantages including by way of example: a web content provider may better understand its users; the web content provider may better protect the privacy of users; in certain implementations, the protection may be provided relatively simply for the web content providers; in certain implementations, such protection can be added without the web content provider having to install any new hardware or software on its own server systems; code and/or systems can be flexibly provided by an organization or other entity; such an organization or other entity can aggregate data received across many entities that operate many domains, including telemetry data and/or analyzed telemetry data; and such an organization or other entity can integrate one or more security measures for its customers. Additional features and advantages are apparent from the examples illustrated and described herein.

BRIEF DESCRIPTION OF THE DRAWINGS

FIG. 3A are diagrams of examples of affinity data with different types of affinity scores;

FIG. 3B are diagrams of other examples of affinity data with different types of affinity scores f;

FIG. 3C are diagrams of examples of affiliate content obtained based on affinity scores for the affinity data;

Figure 1:
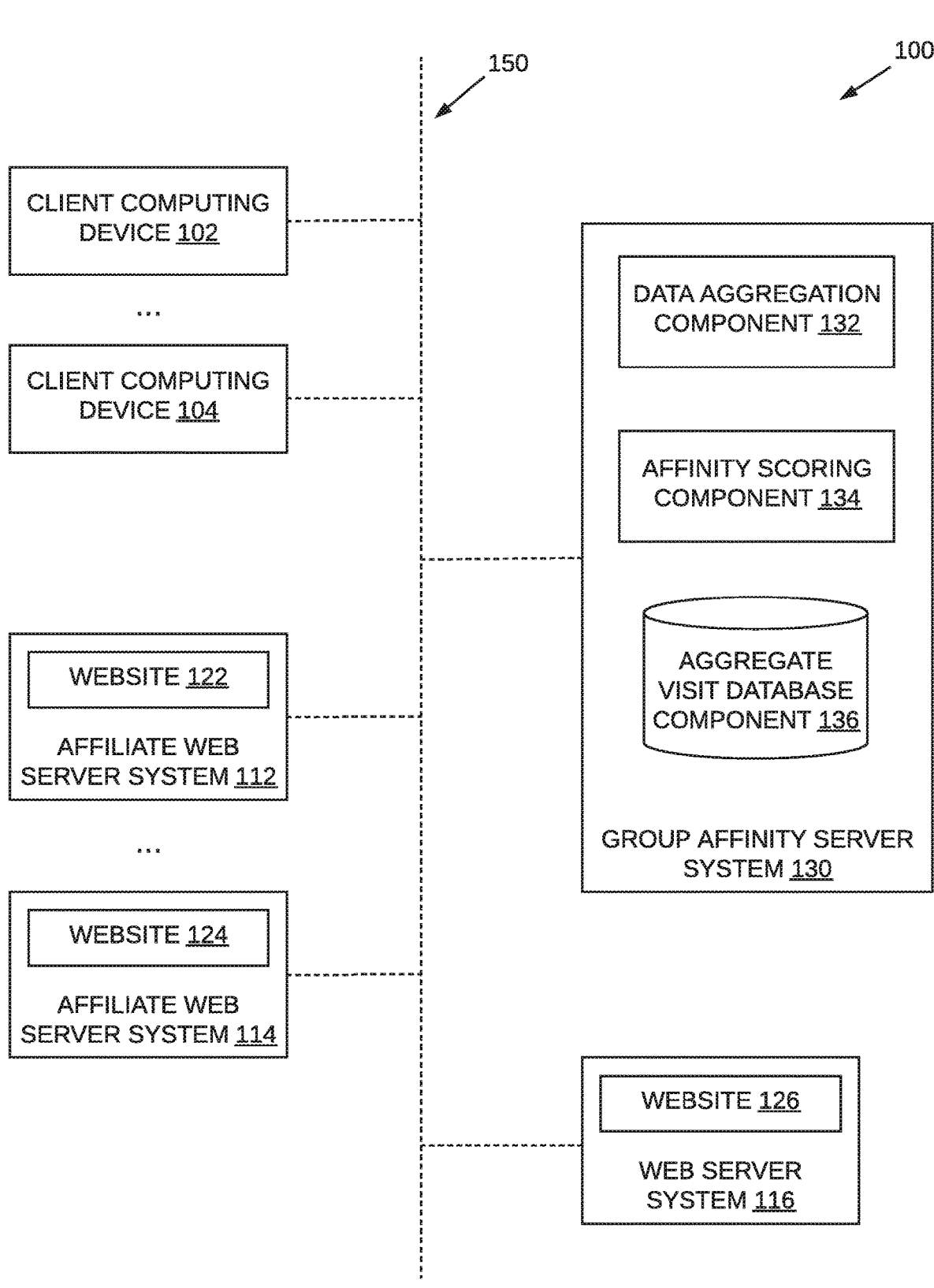
FIG. 1 is a block diagram of an example of a system that includes an example of a group affinity server system.

While each of the drawing figures illustrates a particular example for purposes of illustrating a clear example, other examples may omit, add to, reorder, or modify any of the elements shown in the drawing figures. For purposes of illustrating clear examples, one or more figures may be described with reference to one or more other figures, but using the particular arrangement illustrated in the one or more other figures is not required in other examples.

DETAILED DESCRIPTION

In the following description, for the purpose of explanation, numerous specific details are set forth in order to provide a thorough understanding of examples of this technology. It will be apparent, however, that examples of this technology may be practiced without these specific details. In other instances, well-known structures and devices are shown in block diagram form in order to avoid unnecessarily obscuring examples of this technology.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any other characteristic of the referenced items unless otherwise specified; the terms "such as", "e.g.", "for example", and the like describe one or more examples but are not limited to the described example(s); the terms "comprises" and/or "comprising" specify the presence of stated features, but do not preclude the presence or addition of one or more other features.

A "computer system" refers to one or more computers, such as one or more physical computers, virtual computers, and/or computing devices. As an example, a computer system may be, or may include, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client" refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers.

A "server" (also referred to as "server system", "server computer system" or "server device") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is, a server may include a first server computing device and a second server computing device, which may provide the same or different functionality to the same or different set of clients.

"Instrumentation code" refers to source code, bytecode, or binary software that is executed on a computer. For example, instrumentation code may be JavaScript that generates data on a client and sends that data, referred to as telemetry data, to a server. Also, for example, instrumentation code may be a pre-compiled library that embedded into a mobile application using a compiler or linker. The instrumentation code may send the telemetry data to a server over one or more requests or transactions. The instrumentation code may attach telemetry data to one or more subsequent requests or transactions.

General Overview

This document generally describes systems, methods, devices, and other techniques for group-based affinity scoring for affiliate websites. An entity operating a web server system for a set of users may wish to present its users with options for various services provided by other entities, such as affiliates and partners. For example, a bank may wish to optimally present an ordered list of private label credit card programs to a user based on affinity data calculated for the user while meeting privacy obligations to the user.

In this example, the plurality of client computing devices 102-104 each comprise a computing device that may make one or more requests to one or more of the affiliate web server systems 112-114 or the web server system 116, although the plurality of client computing devices 102-104 may perform other types and/or numbers of operations and/or functions with other systems and/or devices.

Figure 2A:
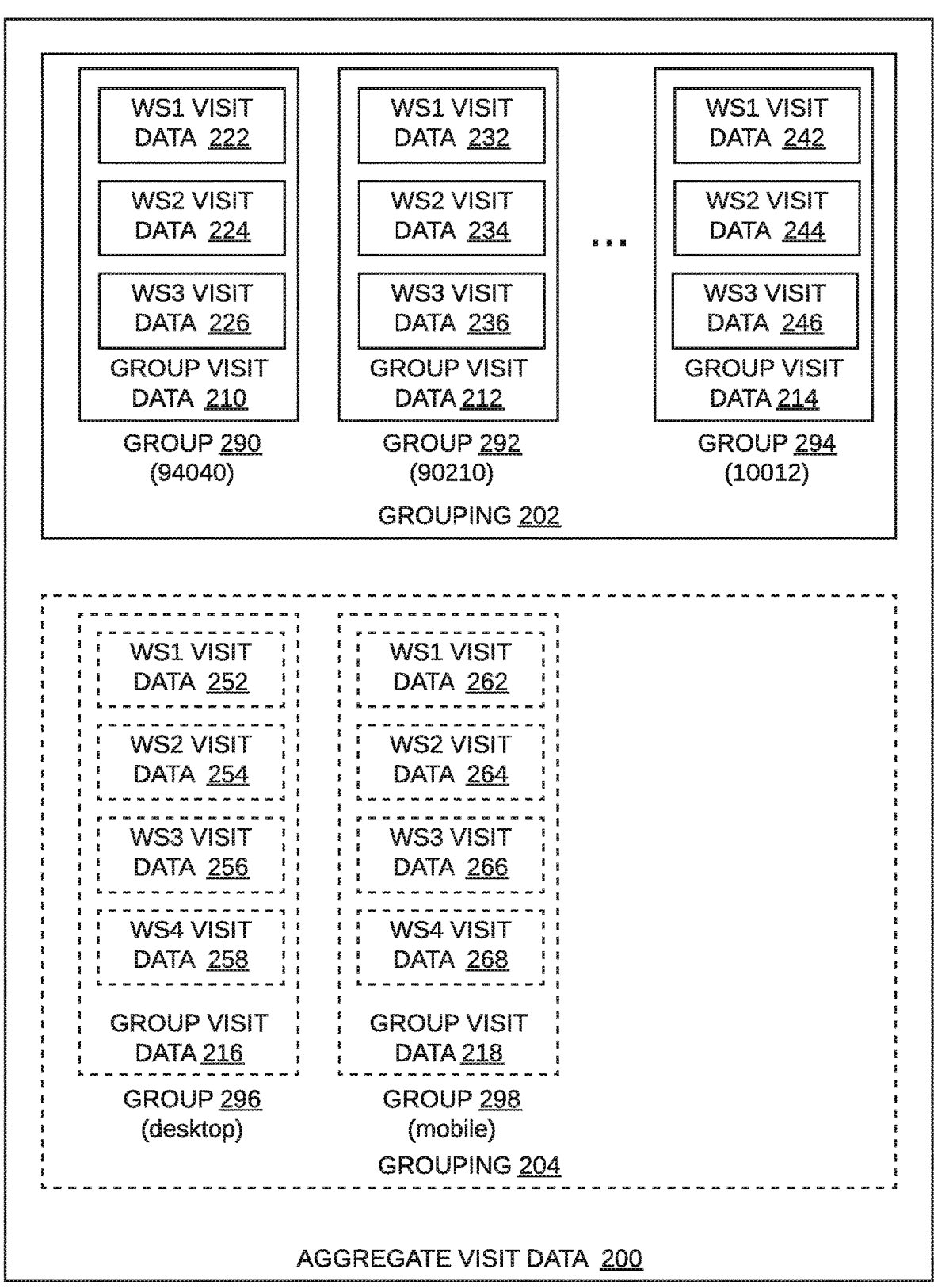
FIG. 2A is a diagram illustrating examples of aggregate visit data for groupings each with multiple groups.
Figure 2B:
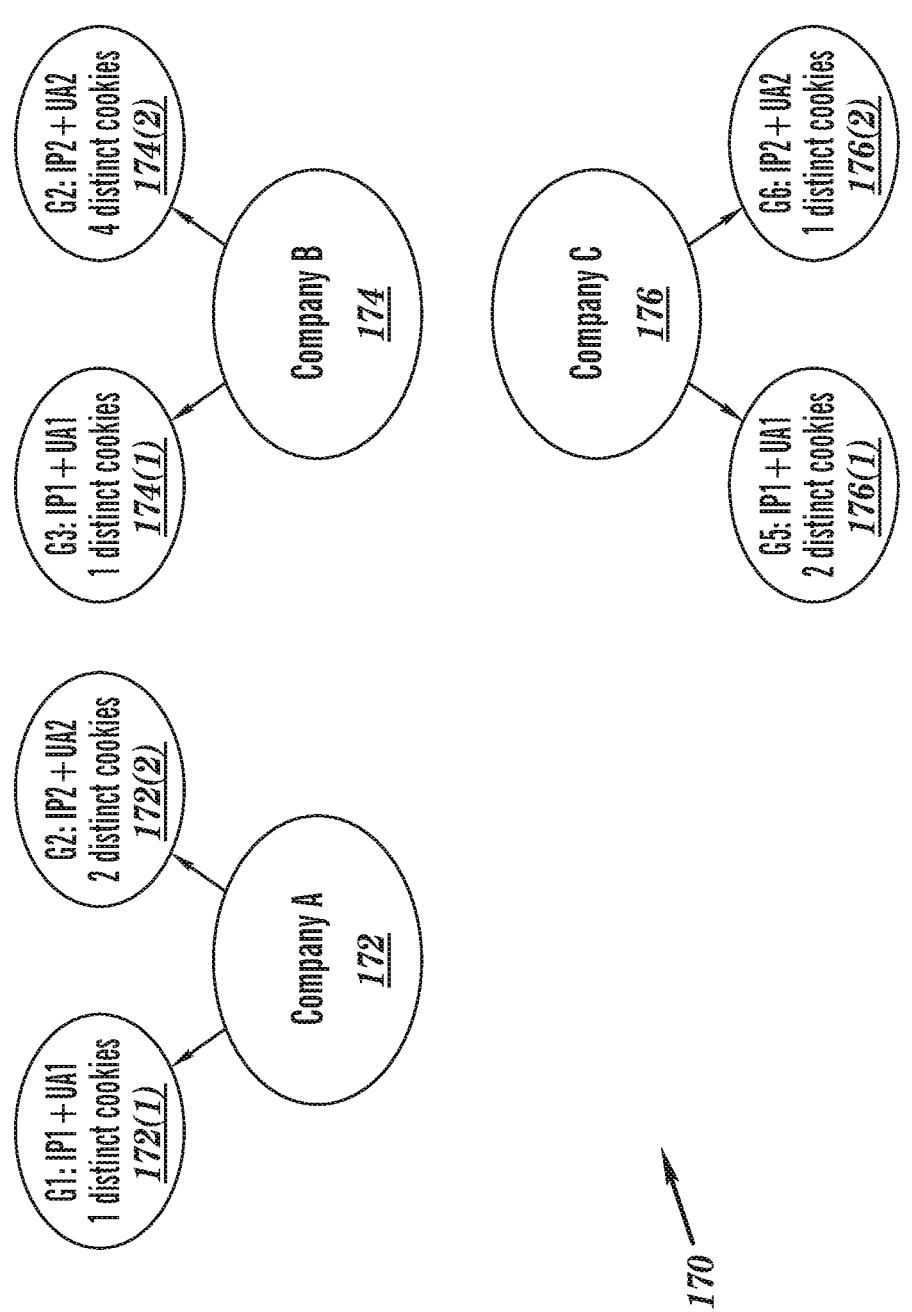
FIG. 2B is a diagram illustrating an example of aggregate visit data for company websites for one exemplary group.

In this example, the group affinity server system 130 may collect and update aggregate visit data regarding visits from one or more client computing devices 102-104 to one or more affiliate websites 122-124 hosted by one or more of the affiliate web server systems 112-114. The group affinity server system 130 may generate affinity data corresponding to one of the client computing devices 102-104 using the aggregate visit data as illustrated in FIGS. 2A and 2B by way of example only. In this example, the affinity data includes at least one affinity score for at least one affiliate website, although the infinity data may comprise other types of information.

The group affinity server system 130 may receive request data corresponding to a particular request from one of the client computing devices 102-104 to one of the affiliate web server systems 112-114. Based on the request data, the group affinity server 130 may determine one or more groups corresponding to the particular request and obtains group visit data for the one or more groups from the aggregate visit data. The group affinity server system 130 may generate affinity data for the particular request using the group visit data for the one or more groups. The affinity data is usable to determine affiliate content that is then served in association with web content served by one of the affiliate web server systems 112-114, such as web content that is served in response to the particular request from the requesting one of the client computing devices 102-104.

The techniques for group-based affinity scoring described herein are compatible with privacy regulations, such as the Gramm-Leach-Bliley Act (GLBA), the EU General Data Protection Regulation (GDPR), the California Consumer Privacy Act (CCPA), and the like. The techniques for group-based affinity scoring can be implemented with pseudonymized request data as well as aggregated data associated with a group rather than any individual user.

The various techniques described herein may achieve a number of advantages including by way of example: a web content provider may better understand its users; the web content provider may protect the privacy of users; the protection may be provided relatively simply for the web content providers in certain implementations; in certain implementations, such protection can be added without the web content provider having to install any new hardware or software on its own server systems; code and/or systems can be provided flexibly by an organization or other entity; such an organization or other entity can aggregate data received across many entities that operate many domains, including telemetry data and/or analyzed telemetry data; such an organization or other entity can integrate one or more security measures for its customers. Additional features and advantages are apparent from the examples illustrated and described herein.

System Overview

A system 100 that includes an example of a group affinity server system 130 is illustrated in FIG. 1. The system 100 includes the plurality of client computing devices 102-104, the plurality of affiliate web server systems 112-114, the web server system 116, and the group affinity server system 130, although the system may comprise other types and/or numbers of other systems, devices, components and/or other elements in other configurations. For ease of illustration, the plurality of client computing devices 102-104 and plurality of affiliate web server systems 112-114 each illustrate two devices and two systems, respectively, although each could have other numbers of devices or systems and/or other elements. The client computing devices 102-104, the affiliate web server systems 112-114, the web server system 116 and the group affinity server system 130 communicate over one or more networks 150. The network(s) 150 may include one or more local area networks (LANs) and/or one or more wide area networks, such as the Internet.

In this example, the plurality of client computing devices 102-104 each comprise a computing device that may make one or more requests to the affiliate web server systems 112-114 or to the web server system 116, although the plurality of client computing devices 102-104 may perform other types and/or numbers of operations and/or functions including making requests to other systems or devices.

In this example, the affiliate web server systems 112-114 host websites 122-124 by making web content belonging to the websites 122-124 available to one or more of the client computing devices 102-104, although the affiliate web server systems 112-114 may host other data and/or execute other functions or other operations. A website 122-124 hosted by an affiliate web server system 112-114 is also referred to herein as an affiliate website. An affiliate may be an entity, such as but not limited to a corporation, business, non-profit, or other party. An affiliate may own, control, and/or maintain an affiliate web server system 112-114. Alternatively and/or in addition, an affiliate may own, control, maintain, and/or publish an affiliate website 122-124. The group affinity server system 130 may maintain and update aggregate visit data for the affiliate websites 122-124 and provides group-based affinity scoring for web for the affiliate websites 122-124.

As used herein, the term "website" refers to a collection of web pages, web resources, and other web content made available over the Internet. Often, a website shares a single domain name or set of related domain names that are owned or controlled by a common entity, such as an affiliate. A website may include web page content accessible over the Internet through a browser, and/or as web content that is accessible over the Internet from an application. Such applications may include web applications executing in browsers installed on the client computing devices 102-104, and/or native applications installed on the client computing devices 102-104. The web content associated with the websites 122-124 may include one or more web pages, images, audio, video, messages, files, data, scripts, services, application content, and other content available over the network 150, such as but not limited to the Internet. In some examples, the websites 122-124 includes any data, instructions, or other content provided by the affiliate web server systems 112-114 over the network 150, including responses to requests from the client computing devices 102-104.

Group Affinity Server System

In this example, the group affinity server system 130 includes a data aggregation component 132, an affinity scoring component 134, and an aggregate visit database component 136, although the group affinity server system 130 may have other components and/or other elements, such as those shown in group affinity server system 450 by way of example only.

In this example, the data aggregation component 132 may collect and update aggregate visit data regarding visits from the client computing devices 102-104 to the affiliate websites 122-124 hosted by the affiliate web server systems 112-114. For example, the data aggregation component 132 may update aggregate visit data in the aggregate visit database component 136 by processing request data for a plurality of requests between the client computing devices 102-104 and the affiliate web server systems 112-114. In some examples, the data aggregation component 132 may update the aggregate affiliate data by sending one or more commands or requests to the aggregate visit database component 136.

In this example, the affinity scoring component 134 may generate affinity data that is related to one of the client computing devices 102-104, and may provide the affinity data related to a request, device, or user for use by a web server system 116. Additionally, in this example the affinity data includes at least one affinity score for one or more of the affiliate websites 122-124, although again the affinity data may comprise other information. The particular one of the client computing devices 102-104 may or may not have had prior interaction(s), with one or more of the affiliate web server systems 112-114, that were evaluated by the data aggregation component 132 to generate the aggregate visit data.

In this example, the aggregate visit database component 136 may maintain a database comprising aggregate visit data collected on the affiliate websites 122-124. As used herein, the term "database" refers to one or more data stores for at least one set of data. The data store may include one or more tangible and/or virtual data storage locations, which may or may not be physically co-located. A simple example of a database is a text file used to store information about a set of data. Another example of a database is one or more data stores that are maintained by a server that processes requests to perform operations on the database. In some examples, the aggregate visit database component 136 includes a database management system (DBMS). As used herein, the term "maintain" refers to performing operations on one or more sets of data stored in a database, such as, but not limited to accessing the database, adding data to the database, removing data from the database, modifying data in the database, searching the database, retrieving data from the database, logging events related to set(s) of data stored in the database, communicating with clients to provide access to the database, and/or other operations related to the database that is maintained.

In some examples, the group affinity server system 130 receives request data corresponding to a request from one of the client computing devices 102-104 to the web server system 116. The affinity scoring component 136 may determine one or more groups based on the request data, obtains the group visit data for the one or more groups from the aggregate visit database component 136, and may generate affinity data for the particular one of the client computing devices 102-104 based on the group visit data for the one or more groups.

The affiliate content may be served to the particular one of the client computing devices 102-104 in association with web content associated with a website 126 hosted by the web server system 116. For example, the affinity data is usable to determine or otherwise identify affiliate content as desired by an entity that owns, controls, and/or maintains the web server system 116, such as stored affiliate content that is correlated to the affinity data, although other manners for determining and providing affiliate content may be used. In some examples, one or more affiliates that own, control and/or maintain an affiliate web server system 112-114 and an entity that owns, controls, and/or maintains the web server system 116 have a business relationship. Alternatively and/or in addition, one or more affiliates may have no formal agreement or relationship with the entity that owns, controls, and/or maintains the web server system 116.

The group affinity server system 130 and/or its components (e.g. data aggregation component 132, an affinity scoring component 134, and/or aggregate visit database component 136) as described herein are presented as individual components for ease of explanation; any action involving one or more components of the group affinity server system 130 may be considered performed with respect to the group affinity server system 130. The group affinity server system 130 and/or its components may be implemented as one or more dependent or independent processes, and may be implemented on one or multiple computers; for example, a component may be implemented as a distributed system. Alternatively and/or in addition, multiple instances of one or more components may be implemented. Furthermore, a component shown may be implemented fully and/or partially in one or more programs or processes, and two or more components shown may be implemented fully and/or partially in one program and/or process.

Aggregate Visit Data

Referring to FIG. 2A, examples of different groupings with multiple groups of aggregate visit data are illustrated. In this example, the aggregate visit data 200 includes group visit data for a grouping 202 with a plurality of groups 290, 292, and 294 and a grouping 204 with a plurality of groups 296 and 298, although aggregate visit data 200 may include other types of groupings and groups of web site visit data. An example of a conceptual view of the aggregate visit data

200 is shown and does not require a particular data structure or a particular organization of the aggregate visit data 200.

As used herein, the term "request data" refers to data describing a request from one of the client computing devices 102-104. For example, request data may include one or more of the request itself, one or more portions of the request, a source and/or destination of the request, other address information associated with the request, header or footer data accompanying the request, and/or any other data that describes the request. For example, the request data for a particular request may include an IP address and a user agent string that may be used to generate a distinct cookie of the one of the client computing devices 102-104 sending the particular request. In some examples, request data may further include additional information that a web server system (e.g. web server system 112, 114, or 116) can associate with the particular request.

The request data for a particular request may be used to determine that the request belongs to a particular group. In this example, the term "group" refers to a category that a request, user, or one of the client computing devices 102-104 can belong to. In some examples, the request data may be used to determine that the request belongs to a particular group is associated with a particular user. For example, when a group corresponds to an age range (e.g. 18-39), then request data associated with an age in that age range for a particular user at one of the client computing devices 102-104 may be used to identify that particular group. Alternatively and/or in addition, the request data may be used to determine that the request belongs to a particular group based on an association with one of the client computing devices 102-104 rather than any association with a specific user at one of the client computing devices 102-104. For example, when the group corresponds to an Internet Service Provider (ISP), then request data associated with a corresponding ISP for the one of the client computing devices 102-104 may be used to determine the group. In this example, the request data associated with the ISP may be common to the one of the client computing devices 102-104, i.e. not a particular user that uses the one of the client computing devices 102-104.

In some other cases, the request data is not permanently associated to a particular one of the client computing devices 102-104 or a particular user. For example, an ISP may assign a first IP address to one of the client computing devices 102-104 that submits a request to one or more affiliate web server systems. An ISP may later reassign a different IP address to the one of the client computing devices 102-104 that submitted the request.

In some examples, when the request data has changed, the request data may nevertheless indicate that the particular user and/or one of the client computing devices 102-104 belongs to the same group. For example, request data for requests from either the first IP address or the second IP address may also still indicate the same postal code for the one of the client computing devices 102-104, if the one of the client computing devices 102-104 remains in the same location, since a postal code can generally be determined from an IP address.

A grouping refers to a set of groups corresponding to categories of the same type or domain. In this example, grouping 202 is a set of groups 290-294 that correspond to postal codes as illustrated in FIG. 2A. Additionally, in this example grouping 204 is a set of groups 296-298 corresponds to device types also illustrated in FIG. 2A. In some examples, a request, user or one of the client computing devices 102-104 belongs to one group in a particular grouping. Alternatively and/or in addition, a request, a user, or one of the client computing devices 102-104 may belong to one or more groups in a particular grouping. The groups or groupings used for group-based affinity scoring may refer to any category that can be determined based on request data, such as but not limited to: a geolocation; a user demographic; a user preference; another user property; a property of the one of the client computing devices 102-104; hardware associated with the one of the client computing devices 102-104; software associated with the one of the client computing devices 102-104, such as an operating system; a platform, or applications; other properties of the one of the client computing devices 102-104; properties of a network or network provider; distinct cookies based on the IP address and the user agent string in the request data, or another category by way of example only.

Group Visit Data

The group visit data 210-214 for groups 290-924 includes website visit data 222-226, 232-236, and 242-246 for one or more affiliate websites. More specifically in this example, the group visit data 210 for group 290 may include WS1 visit data 222 for a first affiliate website WS1, WS2 visit data 224 for a second affiliate website WS2, and WS3 visit data 226 for a third affiliate website WS3; the group visit data 212 for group 292 may include WS1 visit data 232 for the first affiliate website WS1, WS2 visit data 234 for the second affiliate website WS2, and WS3 visit data 236 for the third affiliate website WS3; and the group visit data 214 for group 294 may include WS1 visit data 242 for the first affiliate website WS1, WS2 visit data 244 for the second affiliate website WS2, and WS3 visit data 246 for the third affiliate website WS3, although other numbers and types of groups and groupings may be used.

Updating Aggregate Visit Data Based on Request Data

In this example, when the group affinity server system 130 (although other group affinity server systems may also be used here, such as group affinity server system 450 by way of example only) processes the request data, the group affinity server system 130 may determine a particular website and a particular group of the plurality of groups 290-294 that corresponds to the request based on request data for a particular request. For example, the group affinity server system 130 may determine that the particular request is from one of the client computing devices 102-104 located in the postal code 94040 to a particular affiliate website WS2. The group affinity server system may thus determine that the particular request belongs to group 290 (94040). After determining the corresponding group 290, the group affinity server system may update the group visit data 210 for group 290 to reflect a visit to website WS2 from a member of group 290.

In another example, the group affinity server system 130 may update website visit data that is specific to website WS2 (WS2 visit data 234). Website visit data 222-246 may include data comprising: a number of requests to a corresponding affiliate website; a number of sessions involving the corresponding affiliate website; and/or any other visit data that reflects a visit to the corresponding affiliate website. In some examples, the group affinity server system 130 may update WS2 visit data 234 by incrementing a counter for WS2, although other manners for monitoring visit data can be used. In some examples, the group affinity server system 130 may maintain aggregate visit data over a set or otherwise stored period of time, although other manners for managing maintenance of the aggregate visit data may be used. More specifically in this example, the aggregate visit data may be maintained over the course of a day, a week, or another period of time.

In some examples, when a particular website has not been visited by any user or device belonging to a particular group, no data is maintained for the combination of the particular group and the particular website. For example, if the group affinity server system 130 has not processed any request data for WS3 that corresponds to group 292, then group visit data 212 may include no WS3 visit data 236 for group 292. Alternatively, the WS2 visit data 236 may include a zero value or the like indicating that no request data for the combination has been processed by the group affinity server system 130.

Aggregate Visit Data for a Plurality of Groupings

In some examples, the aggregate visit data includes group visit data for a plurality of groups in two or more groupings. For example, in addition to group visit data 210-214 for a first set of groups 290-294 in a first grouping 202, the aggregate visit data 200 may include group visit data 216-218 for a second set of groups 296-298 in a second grouping 204. In this example, the group visit data 216 for group 296 includes WS1 visit data 252 for the first affiliate website, WS2 visit data 254 for the second affiliate website, WS3 visit data 256 for the third affiliate website, and WS4 visit data 258 for a fourth affiliate website. Additionally, in this example the group visit data 218 for group 298 includes WS1 visit data 262 for the first affiliate website, WS2 visit data 264 for the second affiliate website, WS3 visit data 266 for the third affiliate website, and WS4 visit data 268 for the fourth affiliate website.

The group visit data 210-218 for each group 290-298 may include website visit data for the same set of affiliate websites. Alternatively and/or in addition, group visit data 210-218 for different groupings 202-204 may include website visit data for a different set of affiliate websites. For example, the group visit data 216-218 for grouping 204 includes WS4 visit data 258, 268 for the fourth affiliate website WS4, while the group visit data 210-214 for grouping 202 does not include any website visit data for the fourth affiliate website WS4.

In this example, when the group affinity server system 130 (although other group affinity server systems may also be used here, such as group affinity server system 450 by way of example only) processes request data for a particular request, the group affinity server system 130 may determine a particular website and one or more particular groups 290-298 of the plurality of groups 210-218 that correspond to the particular request based on one or more aspects of request data for the particular request. For example, the request data may indicate that the particular request to affiliate website WS1 is from a mobile device comprising one of the client computing devices 102-104 that is located in the postal code 90210. Based on the request data, the group affinity server system 130 may determine that the particular request belongs to group 292 (90210) from grouping 202 which in this example comprises groups 290, 292, and 294 for different postal codes, and group 298 (mobile) from grouping 204 which comprises group 296 (desktop) and group 298 (mobile) for different types of client computing devices. Based on the determined groups and the request data, the group affinity server system 130 may update the group visit data 212 for group 292 and the group visit data 218 for group 298 to reflect a visit to WS1 by the mobile device comprising one of the client computing devices 102-104.

Aggregate Visit Data for One Exemplary Group

Referring to FIG. 2B, an example of aggregate visit data for one exemplary group 170 comprising company website visit data 172, 174, and 176 for company websites A, B, and C is illustrated. In this example, based on the IP address (IP) and user agent string (UA) in the request data for each particular request, the group affinity server system 130 may determine: company A website visit data 172 comprises one (1) of the distinct cookie for IP1 and UA1 172(1) and two (2) of the distinct cookie for IP2 and UA1 172(2); company B website visit data 174 currently comprises one (1) of the distinct cookie for IP1 and UA1 174(1) and four (4) of the distinct cookie for IP2 and UA2 174(2); and company C website visit data 176 currently comprises two (2) of the distinct cookie for IP1 and UA1 176(1) and one (1) of the distinct cookie for IP2 and UA1 176(2), although as illustrated earlier the aggregate visit data may comprise other types and numbers of groups, websites and website visit data. In this example, each cookie may be a first-party cookie. Accordingly, if a browser visits the website for Company A, which sets a first cookie, and the website for Company B, which sets a second cookie, then the first cookie and the second cookie may not match. In this system a user need not be tracked across websites unlike the systems that some advertising or ad-tech companies use. In one or more examples, no additional data is used to link cookies from different websites to identify individually identify users.

Affinity Data and Affinity Score

In this example, the group affinity server system 130 (although other group affinity server systems may also be used here, such as group affinity server system 450 by way of example only) may receive a new request with request data and may generate affinity data corresponding to a particular one of the client computing devices 102-104 as otherwise illustrated, described or made apparent by way of example herein with reference to FIGS. 2A and 2B. The affinity data corresponding to the particular one of the client computing devices 102-104 may include at least one affinity score for at least one affiliate website (e.g. website 122 or website 124). The group affinity server system 130 receives request data corresponding to a particular request from one of the client computing devices 102-104 to a web server system, such as web server system 116 by way of example. Based on the request data corresponding to the particular request, the group affinity server system 130 may determine or otherwise identify one or more groups (e.g. groups 290-298) corresponding to the particular request, and obtain group visit data (e.g. group visit data 210-218) for the one or more groups from the aggregate visit data (e.g. aggregate visit data 200). The group affinity server system 130 may generate affinity data including a generated affinity score using the group visit data for the one or more identified groups.

Referring to FIG. 3A, a diagram of different examples of affinity data comprising affinity scores generated for affiliate websites is illustrated. In these different examples, each set of affinity data 302-312 includes one or more different types of affinity scores 332-358 for one or more affiliate websites X1-X3.

In one example, an affinity score for each of the affiliate websites X1-X3 may be a numeric score, although other types of scores can be used. For example, affinity data 302 may include a numeric affinity score 850 for affinity score 332 for affiliate website X1; a numeric affinity score 482 for affinity score 334 for affiliate website X2; and a numeric affinity score 236 for affinity score 336 for affiliate website X3, although other types of affinity scoring may be used-. In this example, the numeric affinity score is the number of requests to the particular website over a set of otherwise stored period of time as which is the affinity score for the particular website, although again other types of scores, which may generated in other manners, may be used.

In other examples, an affinity score may be a probabilistic value, such as a correlation or another value derived based on principles of probability and/or statistics, such as a determined statistical probability a particular one of the affiliate websites X1-X3, in this example, will be accessed based on other available website visit data. More specifically, in this example the affinity data 304 may include a calculated or probabilistic affinity score 0.85 for affinity score 338 for affiliate website X1; a calculated or probabilistic affinity score 0.482 for affinity score 340 for affiliate website X2; and a calculated or probabilistic affinity score 0.236 for affinity score 342 for affiliate website X3, although other types of affinity scoring may be used.

In other examples, an affinity score may be a level or other categorization. For example, the affinity data 308 may include a level or other categorization of High for affinity score 350 for affiliate website X1; a level or other categorization of Medium for affinity score 352 for affiliate website X2; and a level or other categorization of Low for affinity score 354 for affiliate website X3, although other types of affinity scoring may be used, based on for example an executed comparison of website visit data as discussed by way of example below with reference to FIG. 2B., although other categories and manners of determining affinity scores for the affiliate data may be used.

Referring to FIGS. 2B and 3A, an example of affiliate scoring by a level or other categorization generated by the group affinity server system 130 (although other group affinity server systems may also be used here, such as group affinity server system 450 by way of example only) will be discussed. In this particular example, the group affinity server system 130 may have programmed instructions for generating an affiliate scoring comprising a particular one of a plurality of levels, such as High, Medium and Low. The programmed instructions may comprise: if the number of distinct cookies between website visit data for two of the different company websites 172-176 is equal or the same, then an affinity score of High is assigned; if the number of distinct cookies between website visit data for two of the different company websites 172-176 is within one, then an affinity score of Medium is assigned; and if the number of distinct cookies between website visit data for two of the different company websites 172-176 more than one, then an affinity score of Low is assigned, although again other manners of determining levels or other manners for generating other affinity scores may be used.

Accordingly, by way of illustrating an example with the programmed instructions for the scoring rules above, if a new request or first request for company website A has request data comprising a distinct cookie with IP1 and UA1, then an affinity score of High would be determined for the affiliate website for Company B because the affinity score for affinity data for the website for Company A and for the affiliate website for Company B both have one (1) cookie with IP1 and UA1.

Additionally, in this example with the programmed instructions for the scoring rules above, if the new request or first request for company website A again has request data comprising a distinct cookie with IP1 and UA1, then an affinity score of Medium would be determined for the affiliate website for Company C because the affinity score for affinity data for the website for Company A is one (1) and the affinity score for affinity data for the affiliate website for Company C is two (2) for the cookie with IP1 and UA1.

Although one example of a manner for determining affinity scores is illustrated above, other manners for executing programmed instructions for determining affinity scores, (such as the different affinity scores for the affinity data illustrated by way of the examples in FIGS. 3A and 3B) may be used. Further, when determining an affinity score, the affinity data for the request data in the new request or first request does not need to be compared in the manner shown in the example above. Instead, by way of example only, the affinity data for the request data in the new request or first request may be used to determine or otherwise identify other affiliate data which then may be processed to generate affinity scores without further comparison the to the affinity data for the request data in the new request or first request.

Accordingly, as illustrated and describe above, in other examples one or more formulas, calculations, or functions may be used by the group affinity server system 130 to generate an affinity score based on website visit data for a particular website from group visit data for one or more groups. In some examples, an affinity score for an affiliate website may be generated based on group visit data for two or more groups. For example, for request data associated with two groups (e.g. group 292 (90210) and group 298 (mobile)), the group affinity server system 130 may generate an affinity score for a particular affiliate website WS2 by apply a weighting function to combine the WS2 visit data 224 and WS2 visit data 234.

TABLE 1

| C1 | Operator | C2 | Affinity Score |
|---|---|---|---|
| (C1 = 1) | && | (C2 = 1) | High (H) |
| (1 =< C1 && C1 <= 3) | && | (1 <= C2 && C2 <= 3) | Medium (M) |
| (C1 >= 3) | \|\| | (C2 >= 3 \|\| 0) | Low (L) |

TABLE 1 illustrates another example of a manner for determining affinity scores based on the groups in FIG. 2B. In this example, C1 and C2 represent the number of cookies associated with a group. The "&&" operator indicates a logical "AND" that requires both neighboring qualifiers to be true. The "\|\|" operator indicates a logical "OR" that only requires one of the neighboring qualifiers to be true. For purposes of illustrating a clear example, assume the following:

The group affinity server system 130 receives an HTTP request regarding Company A from a browser on a remote computing device.

The request includes a cookie and/or a User-Agent-string-IP-address pair associated with Group 172(1).

Group 172(1), Group 174(1), and Group 176(1) are corresponding groups using the same User-Agent-string-IP-address pair, but for different companies or websites.

The group affinity server system 130 may do the following:

Determine that the affinity score is "H" for Company B because one distinct cookie is associated with Group 172(1) and one distinct cookie is associated with Group 174(1), which when respectively substituted for C1 and C2 in TABLE 1 has an affinity score of "H".

Determine that the affinity score is "M" for Company C because one distinct cookie is associated with Group 172(1) and two distinct cookies are associated with Group 176(1), which when respectively substituted for C1 and C2 in TABLE 1 has an affinity score of "M".

Return the affinity scores to the browser.

In this example, the group affinity server system 130 receives a request from a browser and then responds with the affinity score. The group affinity server system 130 may also instruct the browser to cache this data in a cookie or other storage mechanism. The browser can use the cached data in the future without causing the browser to send another request to the group affinity server system 130.

The group affinity server system 130 may have the number of distinct cookies associated with each group pre-computed and cached. For example, the group affinity server system 130 may aggregate and update the number of distinct cookies associated with each group each day in a manner as illustrated and described by way of examples herein.

Additionally, or alternatively, the group affinity server system 130 may return an affinity score for one or more groups, such as a "Travel" industry. Continuing with the previous example, assume the following:

Company B and Company C are both in the "Travel" vertical.

The cookies in group 174(1) and group 176(1) are disjointed, and therefore, the total number of distinct cookies for the Travel industry is three.

After substituting the number of distinct cookies for group 172(1) and the combined distinct cookies for the Travel industry, respectively, the group affinity server system 130 may determine that the affinity score is "L". The group affinity server system 130 may include this determination in the response to the browser.

The affinity data may exclude one or more affinity scores for one or more affiliate websites, even if the corresponding group visit data includes website visit data for the one or more affiliate websites. For example, an affinity score may be omitted when the group affinity server system 130 does not meet a stored or otherwise set threshold value for inclusion in the affinity data. For example, affinity data 306 is generated based on the same underlying group visit data as affinity data 308 and a threshold value of "medium". Affinity data 306 includes an affinity score 344 of "high" for website X1, using an affinity score 346 of "medium" for website X2. Affinity data 306 does not include an affinity score for website X3 because the affinity score "low" for website X3 is below the threshold value of "medium".

In some examples, affinity data may include a ranking or an ordered listing of one or more affiliate websites. For example, affinity data 310 includes an ordering 356 of websites X1, X2, and X3. The ordering 356 may for example be generated based on the corresponding group visit data. The ordering 356 implicitly includes affinity scores for affiliate websites X1, X2 and X3. For example, affiliate website X1 is listed in the first position, affiliate website X2 is listed in the second position, and affiliate website X3 is listed in the third position. In other words, the ordering 356 has a ranking that is usable as an affinity score for the websites X1, X2 and X3.

Affinity data may in other examples include an ordering of affiliate websites that excludes one or more affiliate websites, even if the corresponding group visit data includes website visit data for the one or more affiliate websites. For example, affinity data 312 includes an ordering 358 that includes affiliate websites X1 and X2, while omitting affiliate website X3. In some examples, the ordering 358 may exclude one or more affiliate websites based on a stored or otherwise set threshold value, such as a threshold value of an intermediate affinity score calculated in order to generate an ordering 358 or other ranking. Alternatively and/or in addition, the ordering may be based on a number of positions available in the ordering 358. For example, higher-scoring websites may be prioritized over lower-scoring websites in the affinity data if only two affiliate websites will be featured in affiliate content.

Generating Affinity Data Based on Two or More Affiliate Types

In some examples, affinity data may include one or more affinity scores for each of two or more affiliate types. An affiliate may be categorized as one of a plurality of a particular affiliate types. For example, an affiliate that sells a broad variety of consumer goods may be categorized as a "Department Stores", an affiliate that operates passenger planes may be categorized as "Travel", and an affiliate that manufactures and sells a particular clothing brand may be categorized as "Clothing Chain Stores".

Referring to FIG. 3B, a diagram with an example of affinity data comprising affinity scores for affiliate websites of two or more affiliate types is illustrated. In this example, the affinity data 322-328 includes one or more affinity score 372-398 for one or more affiliate websites. For example, affinity data 322 includes affinity scores 372-376 for websites A1, A2 and A3 of a first affiliate type (Department Stores), affinity scores 378-380 for websites B1 and B2 of a second affiliate type (Travel), and affinity scores 382-386 for websites C1, C2 and C3 of a third affiliate type (Clothing Chain Stores).

Affinity data 324 may be generated based on the same underlying group visit data as affiliate affinity data 322, for the same affiliate types, using a threshold value to exclude one or more affiliate websites. Affinity data 324 may include affinity scores 388-390 for websites A2 and A1 for the first affiliate type (Department Stores), and affinity score 392 for websites B2 of the second affiliate type (Travel). No affinity scores are included for any websites of the third affiliate type (Clothing Chain Stores) because the group affinity server system 130 determines no website of the third affiliate type has an affinity score that meets a stored or otherwise set threshold value of "Medium". In some examples, one or more affiliate affinity scores are ordered within an affiliate type. For example, the affinity scores 388-390 for websites A2 and A1 are sorted by affinity score value within the affiliate type (Department Store) websites.

In some examples, the affinity data may include a ranking or an ordered listing of one or more affiliate websites. The ordering may be combined across two or more affiliate types, or may be within each affiliate type. For example, the affinity data 326 may include an ordering 394 of affiliate websites by score. In this example, website A2, with an affinity score of "High", is listed first in the ordering 394; Website B2, with an affinity score of "Medium", is listed second in the ordering 394; and Website A1, with an affinity score of "Medium", is listed third in the ordering 394.

When the affiliate websites are listed in an ordering, the ordering may be based directly on an intermediate affinity score, or one or more other factors. Affinity data 328 may include two orderings 396 and 398 of affiliate websites, with each ordering containing affiliate websites of a specific affiliate type.

Affiliate Content Based on Affinity Data

In this example, the group affinity server system 130 (although other group affinity server systems may also be used here, such as group affinity server system 450 by way of example only) may use the affinity data (e.g. affinity data 302-328) to determine affiliate content. Referring to FIG.

3C, a diagram of an example of affiliate content identified based on affinity data is illustrated. In this example, affiliate content 314 may be identified by the group affinity server system 130 based on affinity data 326. Affiliate content 314 may include individual affiliate content 316-320 for one or more affiliates A2, B2, and A1 that are selected based on for example the affinity data 326. In this example, the individual affiliate content 316-320 may be presented in an ordering that is determined based on the affinity data 326. In some examples, the affiliate content 316-320 may include web content that links to or otherwise interacts with the corresponding affiliate website A2, B2, or A1.

The affiliate content 314 is identified or otherwise generated based on request data for a particular request from one of the client computing devices 102-104 to a particular web server system (e.g. web server system 116). By way of example, affiliate content 314 to be provided may be stored and part or all may be identified based on request data for a particular request from one of the client computing devices 102-104 and the subsequent affiliate scoring as illustrated above. The affiliate content 314 is served to the particular one of the client computing devices 102-104 in association with web content served by the particular web server system, such as web content belonging to a website (e.g. website 126) hosted by the web server system 116. For example, in response to the particular request, the web server system 116 may submit a request to the group affinity server system 130 in this example that may include the request data for the particular request. The group affinity server system 130 may respond to the web server system 116 with the affinity data, allowing the web server system 116 to determine or otherwise identify the affiliate content 314, and serve the affiliate content 314 to the requesting one of the client computing devices 102-104.

In some examples, the group affinity server system 130 may obtain the request data for the particular request without receiving it from the web server system 116. For example, when the group affinity server system 130 is a reverse proxy server system positioned between one of the client computing devices 102 and 104 and the web server system 116, the group affinity server system 130 may receive the request, process the request to obtain the request data, and forward the request to the web server system 116.

Alternatively and/or in addition, the group affinity server system 130 may generate affinity content code and provide the affinity content code for the one of the client computing devices 102-104. For example, the group affinity server system 130 may provide the affinity content code directly to the one of the client computing devices 102-104, or in another example provide the affinity content code to the web server system 116. When executed at the one of the client computing devices 102-104, the affinity content code displays the affiliate content. In some examples, when the affinity content code is executed at the one of the client computing devices 102-104, the affiliate content code obtains individual affiliate content 316-320 for one or more affiliate websites from the Internet. For example, when executed, the affiliate content code can obtain individual affiliate content 316-320 from the group affinity server system 130, affiliate web server systems (e.g. one or more affiliate web server systems 112-114), or another web server system, such as web server system 116 by way of example only.

Updating Aggregate Visit Data Based on Public Information

Figure 4:
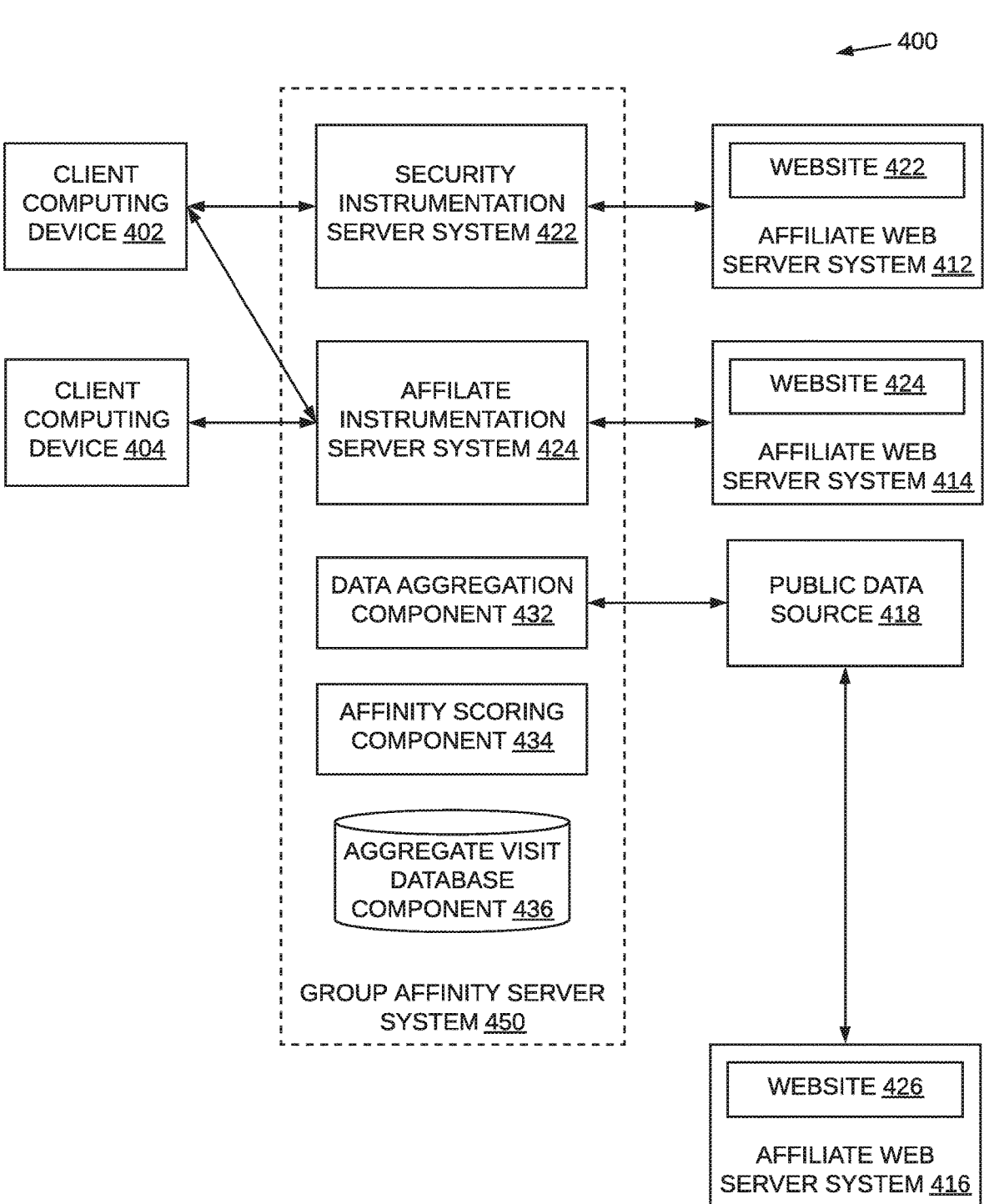
FIG. 4 is a block diagram of another system with another example of a group affinity server system which includes a security instrumentation server system and an affiliate instrumentation server system.

Referring to FIG. 4, a system 400 that includes another example of a group affinity server system 450 with a security instrumentation server system 422 and an affiliate instrumentation server system 424 is illustrated. The system 400 is the same in structure and operation as the system 100, except as otherwise illustrated, described or made apparent by way of the examples herein. The group affinity server system 450 is the same in structure and operation as the group affinity server system 130, except as otherwise illustrated, described or made apparent by way of the examples herein. In this example, the system 400 may include a plurality of affiliate web server systems 412-416, a plurality of client computing devices 402-404, and the group affinity server system 450, although the system may comprise other types and/or numbers of other systems, devices, components and/or other elements in other configurations. For ease of illustration, the plurality of client computing devices 402-404 illustrate two devices and the plurality of affiliate web server systems 412-416 illustrate three systems, respectively, although each could have other numbers of devices or systems and/or other elements. The components of the computer system 400 are connected by one or more networks, such as the Internet. The affiliate web server systems 412-416 host websites 422-426 by making web content belonging to the websites 422-426 available to one or more of the client computing devices 402-404 over the network.

In this example, the plurality of client computing devices 402-404 each comprise a computing device that may make one or more requests to the affiliate web server systems 412-416, although the plurality of client computing devices 402-404 may perform other types and/or numbers of operations and/or functions such as those otherwise illustrated, described or made apparent by way of the examples herein In this example, the group affinity server system 450 may include a data aggregation component 432 that collects and may update aggregate visit data regarding visits from the client computing devices 402-404 to the affiliate websites 422-424. The group affinity server system 450 also may include an affinity scoring component 434 that may generate affinity data that is related to one of the client computing devices 402-404 and provides the affinity data related to request, device, or user for use by a web server system (e.g. web server system 416). The group affinity server system 450 also may include an aggregate visit database component 436 that may maintain a database comprising aggregate visit data collected on the affiliate websites 422-424.

In some examples, the group affinity server system 450 may update the aggregate visit data based on public data. The public data may include data on at least one group or at least one affiliate website 426 for which group visit data is maintained. In some examples, a public data source 418 collects group visit data for the affiliate and/or the affiliate website. Such data may or may not be generated based on requests or other Internet-based data. For example, a public data source 418 may indicate that an affiliate that owns, controls, and/or maintains affiliate web server system 416 is the second most popular restaurant in a first state, and the first most popular restaurant in a second state. The data aggregation component 432 may use this information to update group visit data for postal codes belonging to the first state and the second state.

Instrumentation Code Implementation

In some examples, the group affinity server system 450 may include one or more servers that collect request data when the client computing devices 402-404 communicate with the affiliate web server systems 412-414.

For example, a security instrumentation server system 422 may handle requests from the client computing devices 402-404 for an affiliate web server system 412 in order to detect and prevent one or more attacks. In some examples, the security instrumentation server system 422 collects request data and other security data by inserting instrumentation code into web code requested by the client computing devices 402-404. When executed at the plurality of client computing devices 402-404, the instrumentation code collects telemetry data and transmits the telemetry data to the security instrumentation server system 422. The telemetry data may include the request data used for the techniques for group-based affinity scoring described herein.

Alternatively and/or in addition, an affiliate instrumentation server system 424 may handle requests from the client computing devices 402-404 for an affiliate web server system 414 without necessarily providing additional security services. In some examples, the affiliate instrumentation server system 424 collects request data by inserting instrumentation code into web code requested by the client computing devices 402-404. When executed at the plurality of client computing devices 402-404, the instrumentation code collects telemetry data that may include the request data, and transmits the telemetry data to the security instrumentation server system 424.

EXAMPLE PROCESSES

Figure 5A:
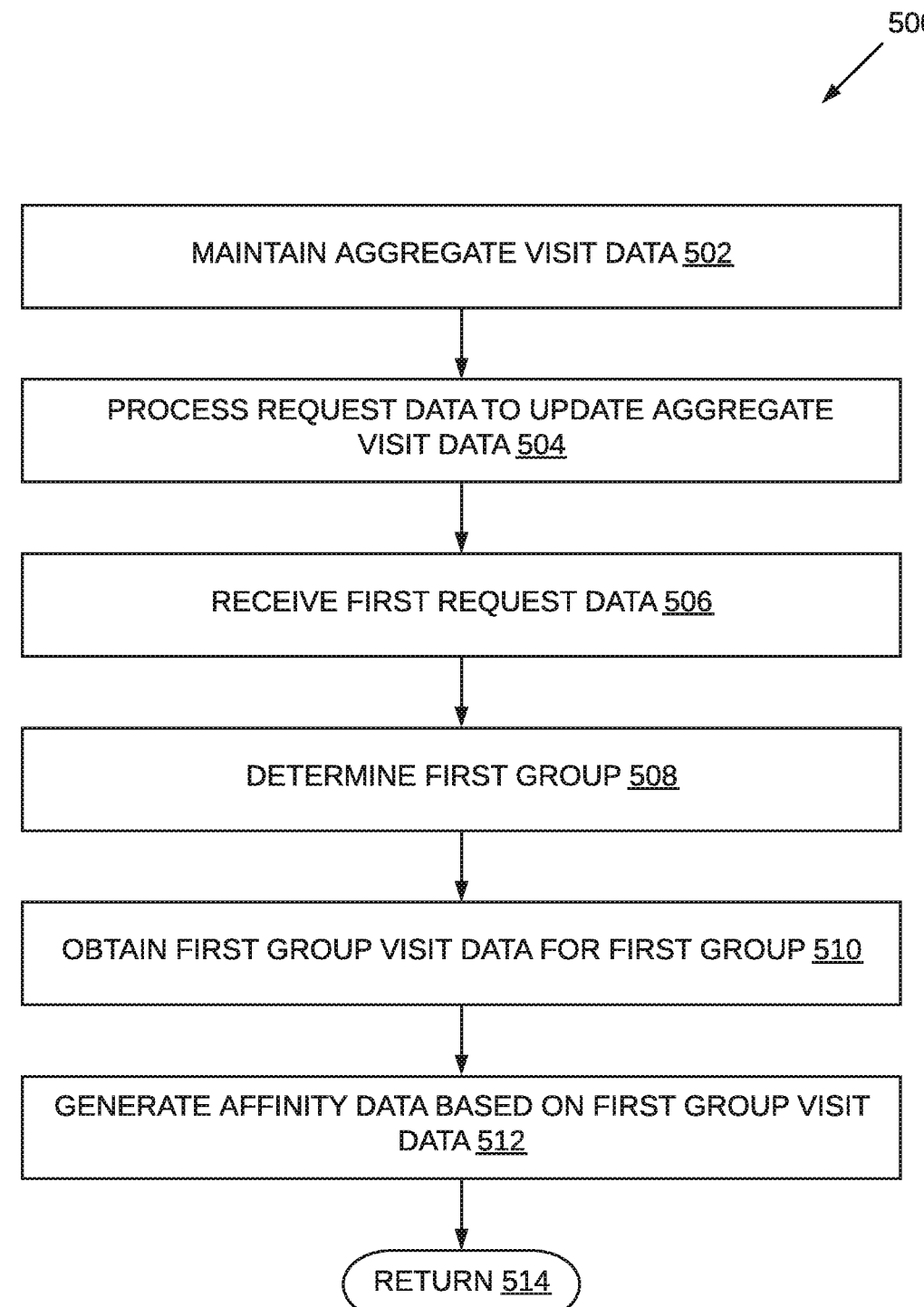
FIG. 5A is a flow chart of an example of a method for group-based affinity scoring for affiliate websites.

An example of a method 500 for group-based affinity scoring for affiliate websites is illustrated in FIG. 5A. Method 500 may be performed by one or more computing devices and/or processes illustrated, described or made apparent by way of the examples herein. For example, one or more steps of method 500 may be performed by a computer system, such as but not limited to computer system 600. In some examples, one or more steps of method 500 are performed by a security server system, which may include one or more defense server systems and/or analysis server systems. Method 500 will be described with respect to the group affinity server system 130 of FIG. 1, but is not limited to performance by such, and could be executed by other systems, such as group affinity server system 450 by way of example only.

At step 502, the group affinity server system 130 (although other group affinity server systems may be used, such as group affinity server system 450 by way of example only) may maintain aggregate visit data comprising group visit data for a plurality of groups and a plurality of affiliate websites. Examples of maintaining website visit data are described by way of example herein with reference to FIGS. 2A and 2B.

At step 504, the group affinity server system 130 may continue to process request data for a plurality of requests from, for example, client computing devices 102-104 to update the aggregate visit data.

At step 506, the group affinity server system 130 may receive a new or first request data corresponding to a first request from one of the client computing devices 102-104 to one of the affiliate web server systems 112-114.

At step 508, the group affinity server system 130 may determine one or more groups from the plurality of groups based on the first request data. Examples of determining one or more groups in one or more groupings for new or first data are again described by way of example herein with reference to FIGS. 2A and 2B

At step 510, the group affinity server system 130 obtains, from the aggregate visit data, first group visit data for the first group.

At step 512, the group affinity server system 130 may generate, based on the first group visit data, affinity data comprising an affinity score used to determine affiliate content that is served in association with web content served by the web server system. As described earlier by way of the different examples in FIGS. 2B, 3A and 3B the affinity data is determined and comprises at least one affinity score for at least a subset of the plurality of affiliate websites. In other examples the group affinity server system 130 may generate and provide affinity content code directly to the one of the client computing devices 102-104 which when executed at the one of the client computing devices 102-104 the affinity content code displays the affiliate content, although other manners for determining or otherwise identifying the affiliate content and serving with the web content for the request being served may be used.

At step 514, method 500 may return and/or terminate. For example, method 500 may pass control to a calling process, generate any appropriate record or notification, return after a method or function invocation, process a next operation requested by a client device, or terminate.

Figure 5B:
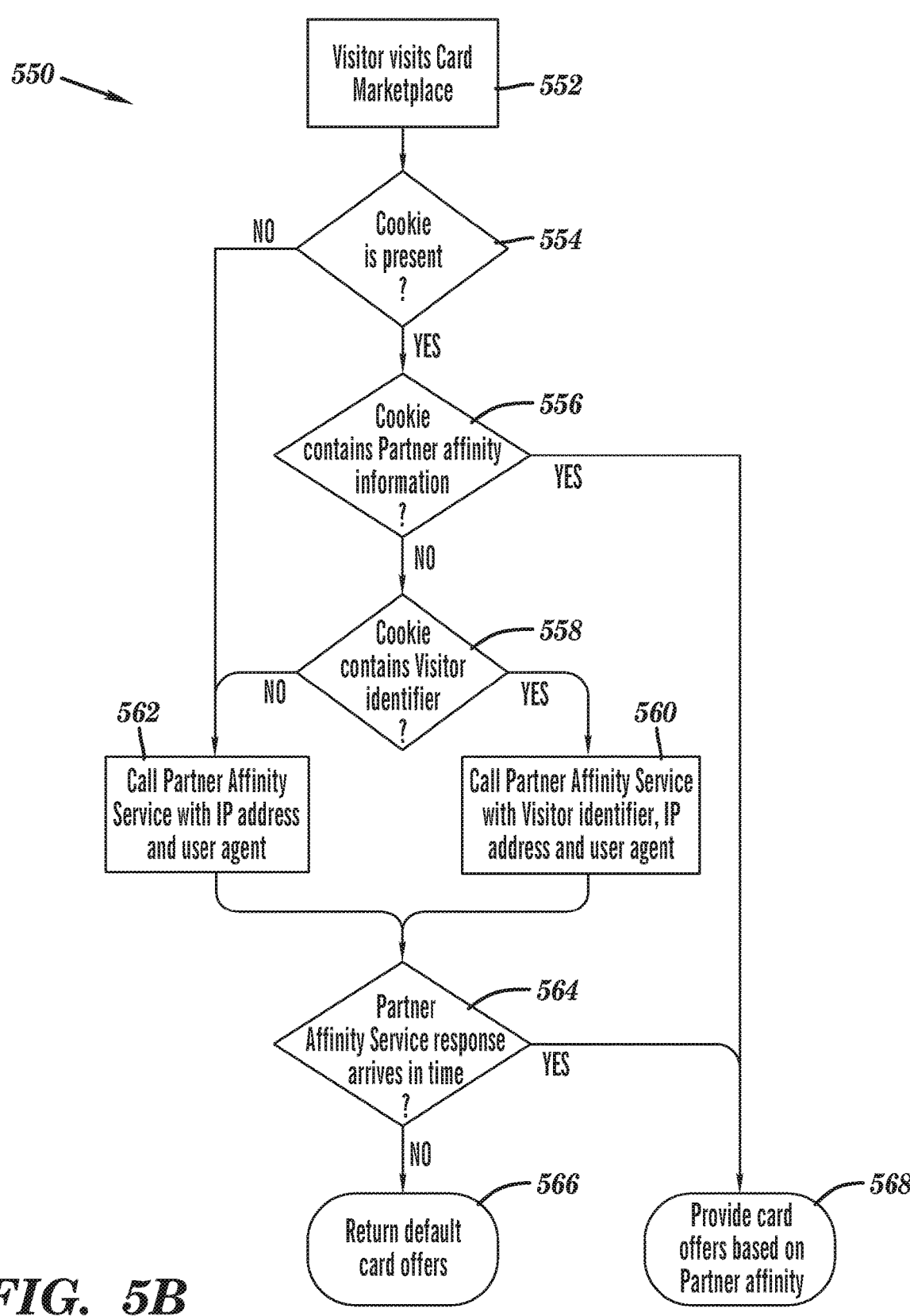
FIG. 5B is a flow chart of another example of a method for group-based affinity scoring to determine and provide affiliate content.

Referring to FIG. 5B, another example of a method 550 for group-based affinity scoring to determine or otherwise identify and provide affiliate content is illustrated. In this example, in step 552 one of the client computing devices 102-104 has a request to a particular website, such as a credit card marketplace by way of example only that is received by the group affinity server system 130. In an embodiment, the group affinity server 130 receives and/or responds to a request for group affinity data before one or more requests are sent to one of the web server system 112-116. In an embodiment, the request is sent to web server system 166 This request from one of the client computing devices 102-104 includes request data that may be used by the group affinity server system 130, such as request data comprising a cookie of an IP address (IP) and a user agent string (UA) in this particular example, although other types of request data may be used.

In step 554, the group affinity server system 130 determines if a cookie is present in the request data from the requesting one of the client computing devices 102-104 in this example. If in the 554 the group affinity server system 130 determines the cookie is present, then the Yes branch is taken to step 556.

In step 556, the group affinity server system 130 determines if this cookie has partner affinity data correlated to affiliate content at one or more affiliate websites on one or more affiliate website servers 112-116 in this example. If in step 556 the group affinity server system 130 determines the cookie does not have partner affinity data correlated to partner affiliate content, then the No branch is taken to step 558.

In step 558, the group affinity server system 130 determines if this cookie contains data comprising a visitor identifier. A visitor identifier is identification data about the particular user at the one of the client computing devices 102-104 in this example. If in step 558 the group affinity server system 130 the group affinity server system 130 determines the cookie contains the visitor identifier, then the Yes branch is taken to step 560.

In step 560, the group affinity server system 130 contacts a call partner affinity service, executing at, for example, one of the affiliate web server systems 112-114, and provides the visitor identifier, the IP address and the user agent string to determine and obtain affiliate content, although other types of information may be used to determine and obtain affiliate content.

If back in step 554 the group affinity server system 130 determines the cookie is not present or if back in step 558 the group affinity server system 130 determines the cookie does not contain the visitor identifier, then in both instances the No branch is taken to step 562. In step 562, the group affinity server system 130 contacts a call partner affinity service, operating for example at one of the affiliate web server systems 112-114, with, for example, the IP address and the user agent string to determine and obtain affiliate content to provide to the requesting one of the client computing devices 102-104, although other types of information may be used.

In step 564, the group affinity server system 130 determines if affiliate content from for example one of the affiliate web server systems 112-114 is received within a set or otherwise stored period of time to serve with the response to the new or first request back to the requesting one of the client computing devices 102-104. If in step 564, the group affinity server system 130 determines a response has not arrived within the set or otherwise stored period of time, then the No branch is taken to step 566.

In step 566, the group affinity server system 130 may obtain and provide default affiliate content from, for example, one of the web server systems 112-116 that is served with the response to the particular request to the requesting one of the client computing devices 102-104.

If back in step 556, the group affinity server system 130 determines the cookie does have previously determined affinity data correlated to affiliate content or if back in step 564 the group affinity server system 130 determines a response with affiliate content has arrived within the set or otherwise stored period of time, then in both instances the Yes branch is taken to step 568. In step 568, the group affinity server system 130 serves the identified affiliate content with the response to the new or first request to the requesting one of the client computing devices 102-104 in this example.

Implementation Mechanisms—Hardware Overview

According to one example, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 6:
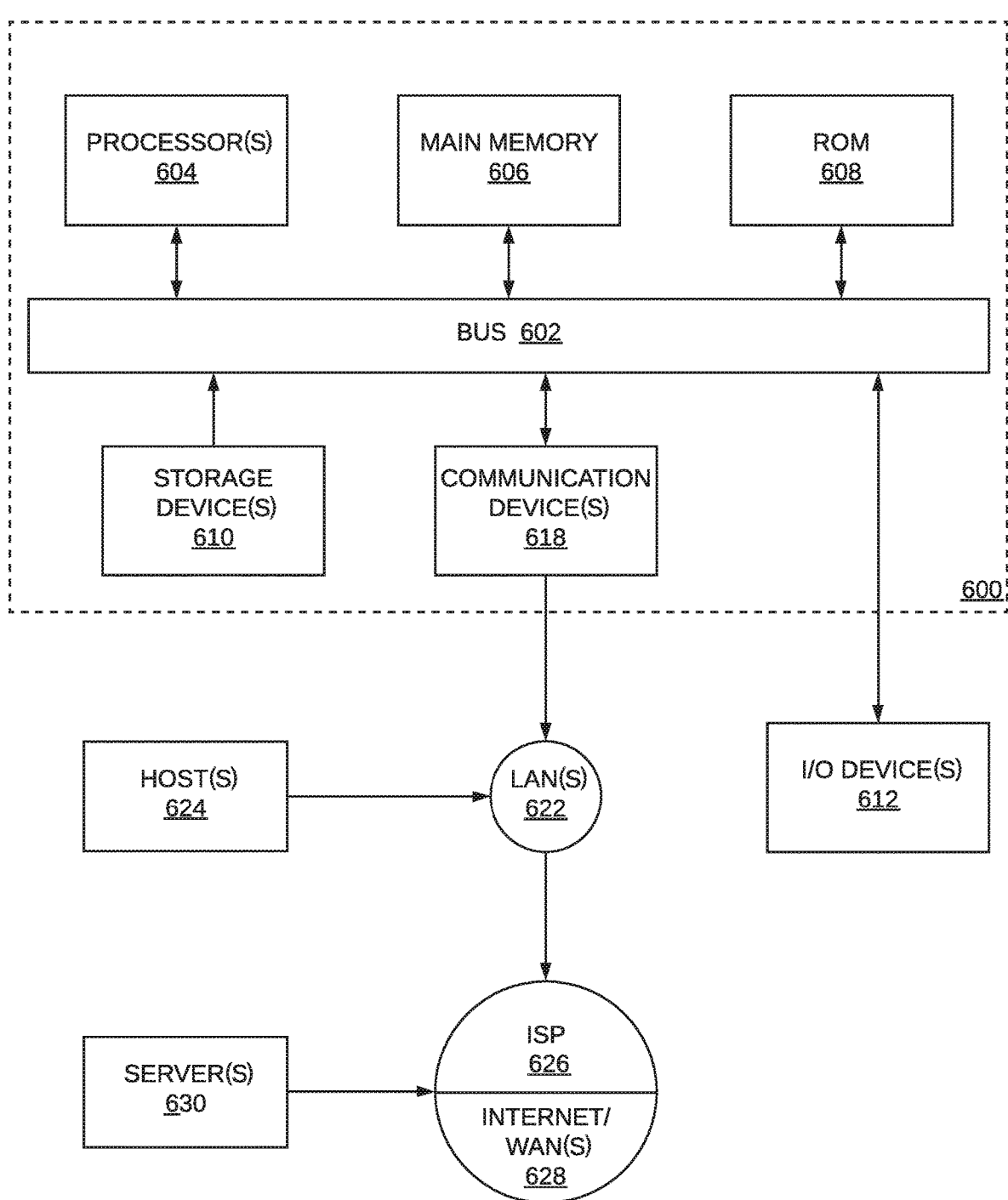
FIG. 6 is a block diagram of an example of a computer system upon which one or more aspects of examples illustrated and described herein may be implemented.

Referring to FIG. 6, an example of a computer system 600 upon which one or more aspects of examples illustrated and described herein may be implemented is shown. In this example, the computer system 600 may include a bus 602 or other communication mechanism for communicating information, and one or more hardware processors 604 coupled with bus 602 for processing information, such as basic computer instructions and data. The hardware processor(s) 604 may include, for example, one or more general-purpose microprocessors, graphical processing units (GPUs), copro-cessors, central processing units (CPUs), and/or other hard-ware processing units.

Computer system 600 also may include one or more units of main memory 606 coupled to bus 602, such as random access memory (RAM) or other dynamic storage, for storing information and instructions to be executed by processor(s) 604. Main memory 606 may also be used for storing temporary variables or other intermediate information dur-ing execution of instructions to be executed by processor(s) 604. Such instructions, when stored in non-transitory storage media accessible to processor(s) 604, turn computer system 600 into a special-purpose machine that is customized to perform the operations specified in the instructions. In some examples, main memory 606 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 600 may in this example further include one or more units of read-only memory (ROM) 608 or other static storage coupled to bus 602 for storing information and instructions for processor(s) 604 that are either always static or static in normal operation but reprogrammable. For example, ROM 608 may store firmware for computer sys-tem 600. ROM 608 may include mask ROM (MROM) or other hard-wired ROM storing purely static information, programmable read-only memory (PROM), erasable pro-grammable read-only memory (EPROM), electrically-eras-able programmable read-only memory (EEPROM), another hardware memory chip or cartridge, or any other read-only memory unit.

In this example, one or more storage devices 610, such as a magnetic disk or optical disk, are provided and coupled to bus 602 for storing information and/or instructions. Storage device(s) 610 may include non-volatile storage media such as, for example, read-only memory, optical disks (such as but not limited to compact discs (CDs), digital video discs (DVDs), Blu-ray discs (BDs)), magnetic disks, other mag-netic media such as floppy disks and magnetic tape, solid state drives, flash memory, optical disks, one or more forms of non-volatile random access-memory (NVRAM), and/or other non-volatile storage media.

The computer system 600 may be coupled via bus 602 to one or more input/output (I/O) devices 612. For example, I/O device(s) 612 may include one or more displays for displaying information to a computer user, such as a cathode ray tube (CRT) display, a Liquid Crystal Display (LCD) display, a Light-Emitting Diode (LED) display, a projector, and/or any other type of display.

I/O device(s) 612 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selec-tions to processor 604 and for controlling cursor movement on another I/O device (e.g. a display). This input device typically has at degrees of freedom in two or more axes, (e.g. a first axis x, a second axis y, and optionally one or more additional axes z . . . ), that allows the device to specify positions in a plane. In some examples, the one or more I/O device(s) 612 may include a device with combined I/O functionality, such as a touch-enabled display.

Other I/O device(s) 612 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor(s) 604 over bus 602.

The computer system 600 may implement the techniques described herein using customized hard-wired logic, one or more ASICs or FPGAs, firmware or program logic which, in combination with the computer system causes or programs, causes computer system 600 to be a special-purpose machine. According to one example, the techniques herein are performed by computer system 600 in response to processor(s) 604 executing one or more sequences of one or more instructions contained in main memory 606. Such instructions may be read into main memory 606 from another storage medium, such as one or more storage device(s) 610. Execution of the sequences of instructions contained in main memory 606 causes processor(s) 604 to perform the process steps described herein. In alternative examples, hard-wired circuitry may be used in place of or in combination with software instructions.

Computer system 600 may also include one or more communication interfaces 618 coupled to bus 602. Commu-nication interface(s) 618 provide two-way data communi-cation over one or more physical or wireless network links 620 that are connected to a local network 622 and/or a wide area network (WAN), such as the Internet. For example, communication interface(s) 618 may include an integrated services digital network (ISDN) card, cable modem, satellite modem, or a modem to provide a data communication connection to a corresponding type of telephone line. Alter-natively and/or in addition, communication interface(s) 618 may include one or more of: a local area network (LAN) device that provides a data communication connection to a compatible local network 622; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 628); and other networking devices that establish a communication channel between computer system 600 and one or more LANs 622 and/or WANs.

Network link(s) 620 typically provides data communica-tion through one or more networks to other data devices. For example, network link(s) 620 may provide a connection through one or more local area networks 622 (LANs) to one or more host computers 624 or to data equipment operated by an Internet Service Provider (ISP) 626. ISP 626 in turn provides connectivity to one or more wide area networks 628, such as the Internet. LAN(s) 622 and WAN(s) 628 both use electrical, electromagnetic or optical signals that carry digital data streams. The signals through the various net-works and the signals on network link(s) 620 and through communication interface(s) 618 are example forms of trans-mission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media may include coaxial cables, copper wire and fiber optics, including traces and/or other physical electrically conductive components that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its main memory 606 and send the instructions over a telecommunications line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 may send messages and receive data, including program code, through the network(s), network link 620 and communication interface 618. In the Internet example, one or more servers 630 might transmit signals corresponding to data or instructions requested for an application program executed by the computer system 600 through the Internet 628, ISP 626, local network 622 and a communication interface 618. The received signals may include instructions and/or information for execution and/or processing by processor(s) 604. Processor(s) 604 may execute and/or process the instructions and/or information upon receiving the signals by accessing main memory 606, or at a later time by storing them and then accessing them from storage device(s) 610.

OTHER ASPECTS OF DISCLOSURE

In the foregoing specification, examples of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method implemented by a network traffic management system comprising one or more group affinity server systems, server devices, or client devices, the method comprising:

receiving group visit data for a plurality of groups and a plurality of affiliate websites;

aggregating the group visit data based on predetermined group characteristics;

receiving first request data corresponding to a first request from a client to a web server system;

pseudonymizing the first request data;

determining, based on analyzing the pseudonymized first request data and the aggregated visit data, at least a first group from the plurality of groups;

obtaining, from the aggregate visit data, first group visit data for the first group including cookies associated with each affiliate website;

generating, based on the first group visit data and pseudonymized version of the first request data, affinity data comprising affinity scores for the affiliate websites, wherein the affinity scores for the affiliate websites comprise affinity score levels, and wherein the affinity scores assigned to the affiliate websites each indicate a probabilistic value that the client will access each particular website;

determining, based on the affinity data, affiliate content to be served by the web server system based on the affinity score levels in the affinity data in response to the first request by sending a request to the web server system using an identifier, an IP address, a user agent string, or combinations thereof from the cookies;

monitoring requests from the client by analyzing received cookie data associated with the request, wherein analyzing the cookie data comprises determining whether the cookie data has partner affinity data correlated to the affiliate content;

responsive to determining that the cookie data does not have the partner affinity data, obtaining the partner affinity data from an executed partner affinity service with the identifier, IP address, and the user agent string;

responsive to receiving the partner affinity data from the executed partner affinity service within a predetermined period of time, providing the affiliate content based on the partner affinity data to the client by generating and transmitting, to the web server system affinity content code configured, when executed at the web server system to obtain and provide the affiliate content to the client; and responsive to not receiving the partner affinity data from the executed partner affinity service within the predetermined period of time, providing default affiliate content to the client.

2. The method of claim 1, further comprising:

updating the aggregate visit data based on public data corresponding to at least one group of the plurality of groups and at least one website of the plurality of affiliate websites.

3. The method of claim 1, wherein the affinity content code is configured to obtain the affiliate content from two or more server systems.

4. The method of claim 1, further comprising:

inserting instrumentation code into web code requested by the client, wherein the instrumentation code is configured to collect telemetry data when executed by the client; and receiving the telemetry data generated at the client, wherein the determining the at least first group from the plurality of groups is based on the telemetry data corresponding to the first request.

5. The method of claim 1, further comprising:

providing security services to at least one affiliate web server system that hosts at least one website of the plurality of affiliate websites;

wherein the security services comprise inserting instrumentation code into web code requested from the at least one affiliate web server system by the client, wherein the instrumentation code when executed is configured to:

collect telemetry data comprising at least a portion of the request data; and receive the telemetry data including said at least a portion of the request data from the client.

6. A non-transitory computer readable medium having stored thereon instructions for workload processing comprising executable code that, when executed by one or more processors, causes the one or more processors to:

receive group visit data for a plurality of groups and a plurality of affiliate websites;

aggregate the group visit data based on processed request data for a plurality of requests;

receive first request data corresponding to a first request from a client to a web server system;

pseudonymize the first request data;

determine, based on analyzing the pseudonymized first request data and the aggregated visit data, at least a first group from the plurality of groups;

obtain, from the aggregate visit data, first group visit data for the first group including cookies associated with each affiliate website;

generate, based on the first group visit data and pseudonymized version of the first request data, affinity data comprising affinity scores for the affiliate websites, wherein the affinity scores for the affiliate websites comprise affinity score levels, and wherein the affinity scores assigned to the affiliate websites each indicate a probabilistic value that the client will access each particular website;

determine, based on the affinity data, affiliate content to be served by the web server system based on the affinity score levels in the affinity data in response to the first request by sending a request to the web server system using an identifier, an IP address, a user agent string, or combinations thereof from the cookies;

monitor requests from the client by analyzing received cookie data associated with the request, wherein analyzing the cookie data comprises determining whether the cookie data has partner affinity data correlated to the affiliate content;

responsive to affinity data, obtain the partner affinity data from an executed partner affinity service with the identifier, IP address, and the user agent string;

responsive to determining that the cookie data comprises the generated receiving the partner affinity data from the executed partner affinity service within a predetermined period of time, provide the affiliate content based on the partner affinity data to the client by generating and transmitting, to the web server system affinity content code configured when executed at the web server system to obtain and provide the affiliate content to the client; and responsive to not receiving the partner affinity data from the executed partner affinity service within the predetermined period of time, provide default affiliate content to the client.

7. The medium of claim 6, wherein the executable code, when executed by the one or more processors further causes the one or more processors to:

update the aggregate visit data based on public data corresponding to at least one group of the plurality of groups and at least one website of the plurality of affiliate websites.

8. The medium of claim 6, wherein the affinity content code is configured to obtain the affiliate content from two or more server systems.

9. The medium of claim 6, wherein the executable code, when executed by the one or more processors further causes the one or more processors to:

insert instrumentation code into web code requested by the client, wherein the instrumentation code is configured to collect telemetry data when executed by the client; and receive the telemetry data generated at the client, wherein the determining the at least first group from the plurality of groups is based on the telemetry data corresponding to the first request.

10. The medium of claim 6, wherein the executable code, when executed by the one or more processors further causes the one or more processors to:

provide security services to at least one affiliate web server system that hosts at least one website of the plurality of affiliate websites;

wherein the security services comprise inserting instrumentation code into web code requested from the at least one affiliate web server system by the client, wherein the instrumentation code when executed is configured to:

collect telemetry data comprising at least a portion of the request data; and receive the telemetry data including said at least a portion of the request data from the client.

11. A group affinity server device, comprising memory comprising programmed instructions stored thereon and one or more processors configured to be capable of executing the stored programmed instructions to:

receive group visit data for a plurality of groups and a plurality of affiliate websites;

aggregate the group visit data based on processed request data for a plurality of requests;

receive first request data corresponding to a first request from a client to a web server system;

pseudonymize the first request data;

determine, based on analyzing the pseudonymized first request data and the aggregated visit data, at least a first group from the plurality of groups;

obtain, from the aggregate visit data, first group visit data for the first group including cookies associated with each affiliate website;

generate, based on the first group visit data and pseudonymized version of the first request data, affinity data comprising affinity scores for the affiliate websites, wherein the affinity scores for the affiliate websites comprise affinity score levels, and wherein the affinity scores assigned to the affiliate websites each indicate a probabilistic value that the client will access each particular website;

determine, based on the affinity data, affiliate content to be served by the web server system based on the affinity score levels in the affinity data in response to the first request by sending a request to the web server system using an identifier, an IP address, a user agent string, or combinations thereof from the cookies;

monitor requests from the client by analyzing received cookie data associated with the request, wherein analyzing the cookie data comprises determining whether the cookie data has partner affinity data correlated to the affiliate content;

responsive to determining that the cookie data does not have the partner affinity data, obtaining the partner affinity data from an executed partner affinity service with the identifier, IP address, and the user agent string;

responsive to receiving the partner affinity data from the executed partner affinity service within a predetermined period of time, provide the affiliate content based on the partner affinity data to the client by generating and transmitting, to the web server system affinity content code configured when executed at the web server system to obtain and provide the affiliate content to the client; and responsive to not receiving the partner affinity data from the executed partner affinity service within the predetermined period of time, providing default affiliate content to the client.

12. The device of claim 11, wherein the one or more processors are further configured to be capable of executing the stored programmed instructions to:

update the aggregate visit data based on public data corresponding to at least one group of the plurality of groups and at least one website of the plurality of affiliate websites.

13. The device of claim 11, wherein the affinity content code is configured to obtain the affiliate content from two or more server systems.

14. The device of claim 11, wherein the one or more processors are further configured to be capable of executing the stored programmed instructions to:

insert instrumentation code into web code requested by the client, wherein the instrumentation code is configured to collect telemetry data when executed by the client; and receive the telemetry data generated at the client, wherein the determining the at least first group from the plurality of groups is based on the telemetry data corresponding to the first request.

15. The device of claim 11, wherein the one or more processors are further configured to be capable of executing the stored programmed instructions to:

provide security services to at least one affiliate web server system that hosts at least one website of the plurality of affiliate websites;

wherein the security services comprise inserting instrumentation code into web code requested from the at least one affiliate web server system by the client, wherein the instrumentation code when executed is configured to:

collect telemetry data comprising at least a portion of the request data; and receive the telemetry data including said at least a portion of the request data from the client.

16. A network traffic management system, comprising one or more network security apparatuses, server devices, or client devices with memory comprising programmed instructions stored thereon and one or more processors configured to be capable of executing the stored programmed instructions to:

receive group visit data for a plurality of groups and a plurality of affiliate websites;

aggregate the group visit data based on processed request data for a plurality of requests;

receive first request data corresponding to a first request from a client to a web server system;

pseudonymize the first request data;

determine, based on analyzing the pseudonymized first request data and the aggregated visit data, at least a first group from the plurality of groups;

obtain, from the aggregate visit data, first group visit data for the first group including cookies associated with each affiliate website;

generate, based on the first group visit data and pseudonymized version of the first request data, affinity data comprising affinity scores for the affiliate websites, wherein the affinity scores for the affiliate websites comprise affinity score levels, and wherein the affinity scores assigned to the affiliate websites each indicate a probabilistic value that the client will access each particular website;

determine, based on the affinity data, affiliate content to be served by the web server system based on the affinity score levels in the affinity data in response to the first request by sending a request to the web server system using an identifier, an IP address, a user agent string, or combinations thereof from the cookies;

monitor requests from the client by analyzing received cookie data associated with the request, wherein analyzing the cookie data comprises determining whether the cookie data has partner affinity data correlated to the affiliate content;

responsive to determining that the cookie data does not have the partner affinity data, obtaining the partner affinity data from an executed partner affinity service with the identifier, IP address, and the user agent string;

responsive to receiving the partner affinity data from the executed partner affinity service within a predetermined period of time, provide the affiliate content based on the partner affinity data to the client by generating and transmitting, to the web server system affinity content code configured when executed at the web server system to obtain and provide the affiliate content to the client; and responsive to not receiving the partner affinity data from the executed partner affinity service within the predetermined period of time, providing default affiliate content to the client.

17. The system of claim 16, wherein the one or more processors are further configured to be capable of executing the stored programmed instructions to:

update the aggregate visit data based on public data corresponding to at least one group of the plurality of groups and at least one website of the plurality of affiliate websites.

18. The system of claim 16, wherein the affinity content code is configured, to obtain the affiliate content from two or more server systems.

19. The system of claim 16, wherein the one or more processors are further configured to be capable of executing the stored programmed instructions to:

insert instrumentation code into web code requested by the client, wherein the instrumentation code is configured to collect telemetry data when executed by the client; and receive the telemetry data generated at the client, wherein the determining the at least first group from the plurality of groups is based on the telemetry data corresponding to the first request.

20. The system of claim 16, wherein the one or more processors are further configured to be capable of executing the stored programmed instructions to:

provide security services to at least one affiliate web server system that hosts at least one website of the plurality of affiliate websites;

wherein the security services comprise inserting instrumentation code into web code requested from the at least one affiliate web server system by the client, wherein the instrumentation code when executed is configured to:

collect telemetry data comprising at least a portion of the request data; and receive the telemetry data including said at least a portion of the request data from the client.

\* \* \* \* \*